Patented Nov. 5, 1929

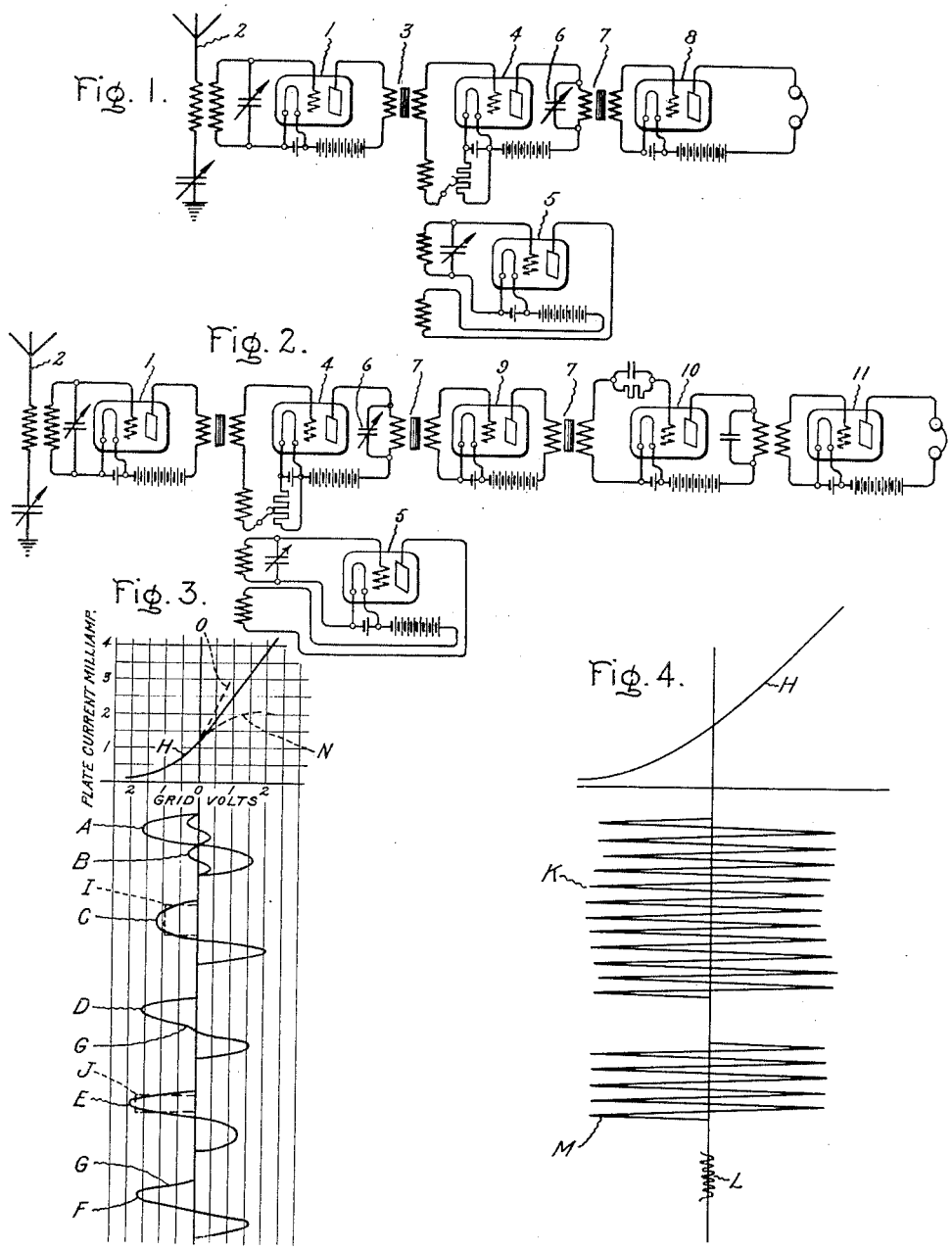

1,734,894

UNITED STATES PATENT OFFICE

WENDELL L. CARLSON, OF SCHENECTADY, NEW YORK, ASSIGNOR TO GENERAL ELECTRIC COMPANY, A CORPORATION OF NEW YORK

METHOD OF AND APPARATUS FOR SIGNAL RECEPTION

Application filed August 3, 1923. Serial No. 655,519.

My present invention relates to the reception of signals transmitted electrically and more particularly to the reception of signals which are transmitted by means of high frequency continuous current.

I will describe my invention with particular relation to the reception of signals transmitted by radio, but it will be understood that it is equally applicable to the reception of signals transmitted over wire lines.

One of the objects of my invention is to provide an efficient method and apparatus for producing at a receiving station an audible indication of telegraphic signals transmitted by continuous waves.

Another object of my invention is to provide an efficient method and apparatus for producing at a receiving station a current of a definite or predetermined frequency corresponding to received signals, but of a materially lower frequency than that of the current by means of which the signals are transmitted. In the case of telegraphic reception this lower frequency may be audible while in the case of telephonic reception it will preferably be of inaudible frequency.

In carrying my invention into effect I provide at the receiving station a source of local oscillations differing materially in frequency from that of the received current and combine the received currents with current from this local source. The frequency of this local source, however, instead of differing from that of the received currents by an amount equal to the lower frequency of the current which it is desired to produce, as in the well known heterodyne system, is made to equal one-half of the sum, or difference of the signal frequency and the frequency desired, as in the harmonic heterodyne system. For example, if the frequency of the received signals is 1,000,000 cycles per second and it is desired to produce a current of 20,000 cycles per second the frequency of the local source may be 510,000 cycles per second or 490,000 cycles per second. By combining a current of 1,000,000 cycles with a current of 510,000 cycles or 490,000 cycles, a current having periodic fluctuations in amplitude of 20,000 cycles will result. The periodic fluctuations will differ in several respects, however, from the periodic fluctuations of the usual beat current produced with the heterodyne system, as will be evident from the description which follows.

The novel features which I believe to be characteristic of my invention are set forth with particularity in the appended claims, my invention itself, however, both as to its organization and method of operation, together with further objects and advantages thereof, will best be understood by reference to the following description taken in connection with the accompanying drawing in which Fig. 1 shows diagrammatically a receiving system adapted for use in carrying out my invention for the reception of telegraphic signals; Fig. 2 shows diagrammatically a circuit organization adapted for use in carrying out my invention in connection with the reception of telephonic signals and Figs. 3 and 4 are curves illustrating the wave form of the current resulting from the combination of received current with current from the local source.

I have indicated in Fig. 3 the variations in wave form of a current resulting from the combination of a current having wave form A derived from a local source with a received signaling current of wave form B having a frequency of the order of magnitude of twice that of the current from a local source. Curves C, D, E and F illustrate the wave form of the combined current under four different conditions of combination. Curve C represents the wave form when a positive maximum of curve B corresponds in time with a positive maximum of curve A. Curve D represents the combined current at a time when the two waves pass through zero at substantially the same time. Curve E represents the combined current when a negative maximum of curve B corresponds in time with a negative maximum of curve A. Curve F represents the combined currents when the two waves are passing through zero at substantially the same time, but with their relative phases differing from the conditions represented by curve D.

It will be observed that the negative half cycle of curve C is of less amplitude than the succeeding positive half cycle, but that it is broadened out and occupies a longer time interval than the positive half cycle. In curve D the negative half cycle is of substantially the same amplitude as the succeeding positive half cycle and both occupy substantially the same time interval. The principal effect of combination in this case is to produce a distortion of both half cycles such for example as the distortion indicated at points G. Curve E is the counterpart of curve C with the negative half cycle of greater amplitude, but occupying a shorter time interval than the positive half cycle. Curve F is the counterpart of curve D.

While there is a periodic fluctuation in the wave form of the combined current the effective energy values of positive and negative half cycles are substantially equal for all phase relations. If this combined wave should be impressed upon a vacuum tube having a linear characteristic, the mean drop in plate current for the negative half cycles would always equal the mean rise of plate current for the positive half cycles, since the mean voltage applied to the grid would be constant for all phase relations. The mean voltage values may be expressed as voltage × time. 2V for one second would give the same mean value as 1V for two seconds when impressed on a linear characteristic, hence no detecting action would result.

With a detector having a non-linear characteristic as illustrated by the curve H in Fig. 3, however, the mean drop in plate current for 1V negative for one second may be as much as 80% of the mean drop with 2V negative for one second. In other words, one negative volt applied to the grid for two seconds will cause a greater decrease in the plate current in terms of voltage × time than two volts for one second. In the extreme case the wave forms of C and E may be treated as shown by dotted lines I and J, which enclose equal areas. With wave form C the plate current will drop from 1.25 milliamperes to approximately .4 milliamperes for the time interval of the one-half cycle of the local oscillations. With wave form E the plate current may be said to drop to .2 milliamperes for one-half the time of one-half cycle of the local oscillation period. This is equivalent to dropping to approximately .75 milliampere for the full half cycle.

The plate current will increase on the positive cycle to 2.5 milliamperes for all the phase relations because the tube characteristic is linear on the positive side. The average plate current will vary approximately from 1.4 to 1.6 milliamperes throughout the cycle change from C to E and back to C again. The resultant periodic variation will be of a frequency corresponding to the difference between double the local oscillation frequency and the signal frequency.

The combined wave form which will actually be produced under the usual condition of operations is indicated by the curve K of Fig. 4, which results from combining a signal current L with a local oscillation M of much greater magnitude. The local oscillation should preferably have a value greatly in excess of that of the impressed signals in order that a greater portion of the detector characteristic may be employed as this increases the efficiency of the circuit as a rectifier. It will be noted that the wave form K differs materially from the wave form produced with the heterodyne system in that successive half cycles of one polarity change in amplitude in the opposite direction to changes in amplitude of the corresponding successive half cycles of the other polarity, whereas in the heterodyne system successive half cycles of one polarity change in amplitude in the same direction as successive half cycles of the other polarity. The mean amplitude of the combined current is constant in the system which I have described while in the heterodyne system the mean amplitude of the combined current varies periodically.

For maximum efficiency of reception in the system which I have described the detector characteristics will follow the dotted line N of Fig. 3, which is the inverse curve of the negative grid characteristic. In other words, the detector should have a non-linear, symmetrical characteristic. For maximum efficiency with heterodyne reception, however, the detector characteristic should continue to slope upward along the dotted line O.

The operation of the system which I have described may be explained from a mathematical standpoint by considering the operation of a detector having a non-linear symmetrical characteristic such as indicated in Fig. 3. The alternating input voltage which is impressed upon this device is the sum of two voltages at different frequencies and is expressed by $e = (e_1 \sin pt + e_2 \sin qt)$ where $(e_1)$ and $(e_2)$ are the maximum values of the two voltages and $\frac{(p)}{2\pi}$ and $\frac{(q)}{2\pi}$ are their respective frequencies. With these assumptions it is possible to find an expression for the alternating component of the output current $i_p$ as a function of the input voltage $e$. A characteristic curve such as that illustrated in Fig. 3 may be expressed by the equation $$i_p = e\epsilon^{-ke^2} \text{ where } e \leq \pm\sqrt{\frac{1}{2k}} \quad (1)$$

Expanding $\epsilon^{-ke^2}$ into a series, we have, $$i_p = e\left[1 - ke^2 + \frac{k^2e^4}{2} - \frac{k^3e^6}{3} + -*\right] = \left[e^{-ke^2} + \frac{k^2e^5}{2} - \frac{k^3e^7}{3} + -*\right] \quad (2)$$

Since $e = e_1 \sin pt + e_2 \sin qt$ $$i_p = (e_1 \sin pt + e_2 \sin qt) - k(e_1 \sin pt + e_2 \sin qt)^3 + \frac{k^2}{2}(e_1 \sin pt + e_2 \sin qt)^5 + -*** \quad (3)$$

$$k(e_1 \sin pt + e_2 \sin qt)^3 = k(e_1^3 \sin^3 pt + 3e_1^2 e_2 \sin^2 pt \sin qt + 3e_1 e_2^2 \sin pt \sin^2 qt + e_2^3 \sin^3 qt) \quad (4)$$

Rewriting the terms of (4)

$$e_1^3 \sin^3 pt = \frac{e_1^3}{4}(3 \sin pt - \sin 3pt) \quad (5)$$

$$3e_1^2 e_2 \sin^2 pt \sin qt = \frac{3e_1^2 e_2}{2}\left[\cos(p-q)t - \cos(p+q)t\right]\sin pt$$

$$= \frac{3e_1^2 e_2}{2}\left[2 \sin qt + \sin(2p-q)t - \sin(2p+q)t\right] \quad (6)$$

$$3e_1 e_2^2 \sin pt \sin^2 qt = \frac{3e_1 e_2^2}{2}\left[\cos(p-q)t - \cos(p+q)t\right]\sin qt$$

$$= \frac{3e_1 e_2^2}{2}\left[2 \sin pt - \sin(p+2q)t - \sin(p-2q)t\right] \quad (7)$$

$$e_2^3 \sin^3 qt = \frac{e_2^3}{4}(3 \sin qt - \sin 3qt) \quad (8)$$

Considering only the first two terms of the power series (2), the frequencies present in the plate current ($i_p$) and their amplitude coefficients are

| Freq. | Coefficients | (9) |
|---|---|---|
| $\frac{p}{2\pi}$ | $(e_1 - \frac{3ke_1^3}{4} - 3ke_1 e_2^2)$ | (a) |
| $\frac{q}{2\pi}$ | $(e_2 - \frac{3ke_2^3}{4} - 3ke_1^2 e_2)$ | (b) |
| $\frac{2p-q}{2\pi}$ | $\frac{(-3ke_1^2 e_2)}{2}$ | (c) |
| $\frac{2p+q}{2\pi}$ | $\frac{(3ke_1^2 e_2)}{2}$ | (d) |
| $\frac{p+2q}{2\pi}$ | $\frac{(3ke_1 e_2^2)}{2}$ | (e) |
| $\frac{p-2q}{2\pi}$ | $\frac{(3ke_1 e_2^2)}{2}$ | (f) |
| $\frac{3p}{2\pi}$ | $\frac{(ke_1^3)}{4}$ | (g) |
| $\frac{3q}{2\pi}$ | $\frac{(ke_2^3)}{4}$ | (h) |

Suppose that ($e_1 \sin pt$) is an incoming radio-frequency single and that ($e_2 \sin qt$) is a local oscillator signal. They are both applied in series to the input of the vacuum tube in the manner indicated in Fig. 3. All frequencies shown in (9) will be present in the plate current.

Frequency (9 $f$) can be made an audio or intermediate frequency by making the local oscillator frequency $\frac{(q)}{2\pi}$ nearly equal to one-half the incoming signal frequency $\frac{(p)}{2\pi}$. For instance, if the incoming signal frequency were (1,000,000) cycles per second and the local oscillator frequency (480,000) cycles per second, the intermediate frequency given by $\frac{(p-2q)}{2\pi}$ would be (40,000) cycles. In other words, if intermediate frequency desired is $\frac{(b)}{2\pi}$, then for any value of $\frac{(p)}{2\pi}$ we must set the frequency of the oscillator such that $$\frac{q}{2\pi} = \frac{p-b}{4\pi}$$

By tuning the intermediate frequency amplifier to the frequency $\frac{(b)}{2\pi}$, all other frequencies are blocked out.

As shown in (9 $f$), the magnitude of the term containing the frequency $\frac{(p-2q)}{2\pi}$ is proportional to the square of the maximum value ($e_2$) of the local oscillator voltage. This is convenient, because the magnitude of ($e_2$) can easily be set at any desired value.

There is no difference frequency $\frac{(p-q)}{2\pi}$ present in the plate circuit, such as is used in the ordinary superheterodyne for the intermediate frequency.

The intermediate frequency $\frac{(p-2q)}{2\pi}$ is the same as would be obtained if the second harmonic of the local oscillator were caused to beat with the signal frequency when the first detector is biased on the lower bend of the characteristic. But it is not obtained in this way since, in the analysis, the local oscillator was assumed to generate a pure sine wave ($e_2 \sin qt$). Neither can there be a second harmonic of $\frac{(q)}{2\pi}$ present in the plate circuit of the tube under the conditions which we have chosen, because Fourier's analysis shows that a symmetrical curve can contain no even harmonics. Also, it can be shown that $(\sin \theta)^n$ will give even harmonics only when $(n)$ is even. Expansions of $(\sin \theta)^n$ for $n=1$ to $n=5$ are given below:

$\sin \theta = \sin \theta$
$\sin^2 \theta = \frac{1}{2}(1-\cos 2\theta)$
$\sin^3 \theta = \frac{1}{4}(3\sin \theta - \sin 3\theta)$
$\sin^4 \theta = \frac{1}{8}(\cos 4\theta - 4\cos 2\theta + 3)$
$\sin^5 \theta = \frac{1}{16}(\sin 5\theta - 5\sin 3\theta + 10\sin \theta)$ A characteristic curve such as we have chosen, which is expressed by equation (2), contains only odd powers of $(e)$ and, therefore, of ($e_2 \sin qt$). It follows that there can be no second harmonic of ($\sin qt$) or any even harmonic present in the plate current.

In the system shown in Fig. 1, a vacuum tube amplifier 1 is provided for amplifying the signals received upon an antenna 2. This amplifying tube is coupled by means of the transformer 3 to a detector tube 4. Local oscillations of the desired frequency are provided by means of an oscillating tube 5. The output circuit of the detector 4 is tuned by means of a variable condenser 6 in shunt to the primary of the transformer 7, or by any other suitable means to the frequency of the periodic fluctuations of the combined current produced in the input circuit of the detector 4. Tube 8 serves as amplifier of the resultant current produced in the output circuit of detector 4. If it is desired to produce an audible indication of telegraphic signals the frequency of the local source 5 will be so chosen that it is equal to one-half of the signaling frequency plus or minus one-half the frequency desired for the audible indication.

In Fig. 2 I have shown a circuit organization which is adapted to produce the same result as the so-called super-heterodyne system. The frequency of the local oscillator in this case is preferably so chosen that the resultant current produced in the output circuit of detector 4 will be of ultra-audible frequency. This current of ultra-audible frequency may be amplified by means of an amplifying tube 9 detected by a detector tube 10 of the usual type and the resultant current amplified by amplifying tube 11.

While I have shown and described only two different circuit organizations for carrying my invention into effect, it will be apparent that many modifications in the choice of frequencies employed as well as in the circuit arrangements used may be made without departing from the scope of my invention as set forth in the appended claims.

What I claim as new and desire to secure by Letters Patent of the United States is:—

1. The method of signal reception which consists in combining a received continuous wave signaling current with a local source of oscilllations of approximately half the frequency of the signaling current but of materially greater voltage, and impressing the combined current upon a detector having a non-linear, symmetrical characteristic.

2. The method of operating a signal detector having a non-linear, symmetrical characteristic which consists in impressing upon a circuit connected thereto two voltages, one of greater magnitude but approximately half the frequency of the other.

3. The method of signal reception which consists in producing by the combination of a received continuous wave signaling current with a local source of continuous oscillations an alternating current in which all half cycles represent substantially equal energy value but in which successive half cycles have different amplitudes and occupy different time intervals, and impressing said current upon a detector having a non-linear characteristic.

4. The method of signal reception which consists in producing by the combination of a received continuous wave signaling current with a local source of continuous oscillations an alternating current having periodic fluctuations in amplitude in which successive half cycles of one polarity are increasing in amplitude while the corresponding successive half cycles of the other polarity are decreasing in amplitude, and impressing said current upon a detector having a non-linear characteristic.

5. The method of signal reception which consists in producing by the combination of a received continuous wave signaling current with a local source of continuous oscillations of a different frequency an alternating current having periodic fluctuations in amplitude of a frequency equal to the difference between twice the frequency of the current having the lower frequency and the frequency of the current having the higher frequency, and in which successive half cycles of one polarity are increasing in amplitude while the corresponding successive half cycles of the other polarity are decreasing in amplitude, and impressing said current upon a detector having a non-linear characteristic.

6. The method of signal reception which consists in producing by the combination of a received continuous wave signaling current with a local source of continuous oscillations of a different frequency an alternating current having periodic fluctuations in amplitude of a frequency equal to the difference between the frequency of the received current and twice the frequency of the local source and in which successive half cycles of one polarity are increasing in amplitude while the corresponding successive half cycles of the other polarity are decreasing in amplitude, and impressing said current upon a detector having a non-linear characteristic.

7. The method of signal reception which consists in producing by the combination of a received continuous wave signaling current with a local source of oscillations of a different frequency, an alternating current in which all of the half cycles represent substantially equal energy values but the wave form of which varies periodically, and detecting said current.

8. The method of signal reception which consists in producing by the combination of a received continuous wave signaling current with a local source of oscillations of a different frequency an alternating current in which all of the half cycles represent substantially equal energy values but successive half cycles occupy different time intervals, and detecting said current.

9. The method of signal reception which consists in producing by the combination of a received continuous wave signaling current with a local source of oscillations of a different frequency an alternating current in which all of the half cycles represent substantially equal energy values but the wave form of which varies periodically, and successive half cycles of one polarity are increasing in amplitude while corresponding half cycles of the other polarity are decreasing in amplitude, and detecting said current.

10. The method of signal reception which consists in producing by the combination of a received continuous wave signaling current with a local source of oscillations of a different frequency an alternating current in which all of the half cycles represent substantially equal energy values but the wave form of which varies periodically at a frequency equal to the difference between the frequency of the current having the higher frequency and twice the frequency of the current having the lower frequency, and successive half cycles of one polarity are increasing in amplitude while corresponding half cycles of the other polarity are decreasing in amplitude, and detecting said current.

11. The method of signal reception which consists in producing by the combination of a received continuous wave signaling current with a local source of oscillations of a different frequency an alternating current in which all of the half cycles represent substantially equal energy values but the wave form of which varies periodically at a frequency equal to the difference between the frequency of the received current and twice the frequency of the local source, and successive half cycles of one polarity are increasing in amplitude while corresponding half cycles of the other polarity are decreasing in amplitude, and detecting said current.

12. The combination in a signal receiving system of a local source of oscillations of a frequency different from that of the signals to be received, a detector having a non-linear symmetrical characteristic, a circuit associated with the detector which is tuned to a frequency equal to the difference between the frequency of the received signals and twice the frequency of the local source, and means for combining received signals with oscillations from the local source and impressing them on said detector circuit.

13. The method of signal reception which consists in producing by the combination of a received continuous wave signaling current with a local source of oscillations of a different frequency, an alternating current in which all of the half cycles represent substantially equal energy values but the wave form of which varies periodically, and impressing the combined current on a detector having a non-linear symmetrical characteristic.

14. The method of signal reception which consists in producing by the combination of a received continuous wave signaling current with a local source of oscillations of a different frequency an alterating current in which all of the half cycles represent substantially equal energy values but successive half cycles occupy different time intervals, and. impressing the combined current on a detector having a non-linear symmetrical characteristic.

In witness whereof, I have hereunto set my hand this 2nd day of August, 1923.

WENDELL L. CARLSON.